US009649834B1

United States Patent
Gervasi et al.

(10) Patent No.: US 9,649,834 B1
(45) Date of Patent: May 16, 2017

(54) STABILIZERS AGAINST TOXIC EMISSIONS IN IMAGING PLATE OR INTERMEDIATE BLANKET MATERIALS

(71) Applicant: XEROX Corporation, Norwalk, CT (US)

(72) Inventors: David J. Gervasi, Pittsford, NY (US); Santokh S. Badesha, Pittsford, NY (US); Mandakini Kanungo, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/193,045

(22) Filed: Jun. 25, 2016

(51) Int. Cl.
  *B41F 7/26* (2006.01)
  *B41C 1/06* (2006.01)
  *C08K 3/04* (2006.01)
  *C08K 3/22* (2006.01)
  *C08J 3/205* (2006.01)
  *C08J 3/24* (2006.01)
  *C08G 77/24* (2006.01)
  *C08G 77/08* (2006.01)

(52) U.S. Cl.
  CPC ............ *B41F 7/26* (2013.01); *B41C 1/06* (2013.01); *C08G 77/08* (2013.01); *C08G 77/24* (2013.01); *C08J 3/2053* (2013.01); *C08J 3/24* (2013.01); *C08K 3/04* (2013.01); *C08K 3/22* (2013.01); *C08J 2383/08* (2013.01); *C08K 2003/2265* (2013.01); *G03G 2215/1623* (2013.01)

(58) Field of Classification Search
  CPC ...... B41F 7/26; B41C 1/06; G03G 2215/1623
  See application file for complete search history.

(56) References Cited

U.S. PATENT DOCUMENTS

| 8,841,401 | B1 * | 9/2014 | Sambhy | C09D 183/08 528/42 |
| 9,283,795 | B1 * | 3/2016 | Kanungo | B41N 10/00 |
| 2014/0060358 | A1 * | 3/2014 | Hsieh | B41N 3/08 101/450.1 |

* cited by examiner

*Primary Examiner* — Blake A Tankersley
*Assistant Examiner* — Michael Robinson
(74) *Attorney, Agent, or Firm* — Prass LLP; Ellis B. Ramirez

(57) ABSTRACT

This disclosure is directed to a material composition that may be usable as a surface component in a plate design for use in variable data digital lithographic image forming devices. The disclosed material composition incorporates infra-red (IR) absorbing filler materials, including carbon black filler material particles in a fluorosilicone polymer or elastomer. The inclusion of the disclosed carbon black material compositions promotes precise heating in a patterning step for a layer of dampening fluid while minimizing harmful byproduct emissions including emissions of trifluoropropionaldehyde (TFPA) resulting from localized heating of a principally fluorosilicone imaging layer. The disclosed homogeneously-dispersed carbon black particles are particularly usable for improving operational characteristics of fluorosilocone-based reimageable surface layers of imaging members employed in the variable data digital lithographic image forming devices.

16 Claims, 1 Drawing Sheet

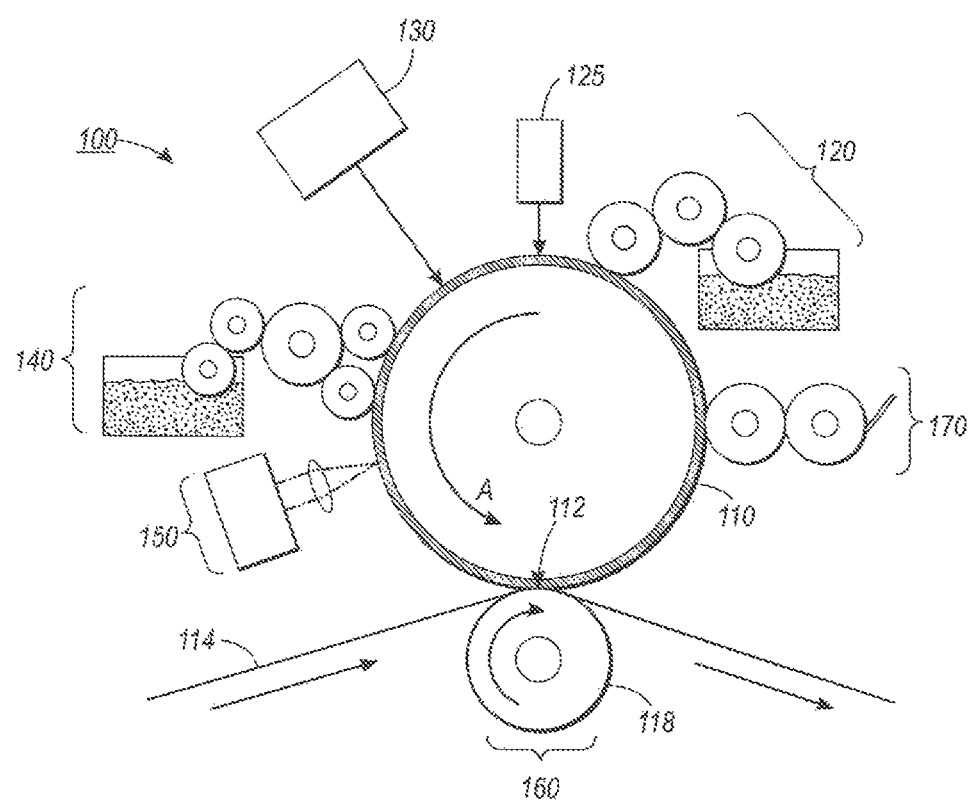

STABILIZERS AGAINST TOXIC EMISSIONS IN IMAGING PLATE OR INTERMEDIATE BLANKET MATERIALS

BACKGROUND

1. Field of the Disclosed Embodiments

This disclosure relates to formulations of carbon black based additives that are adapted for inclusion in intermediate transfer surfaces and reimageable surfaces of imaging members in digital lithographic image forming systems and methods for generating those formulations. In particular, the disclosed embodiments are directed to incorporating carbon black filler materials in various marking and printing system components, such as imaging members or intermediate transfer members specifically formed for use in a new class of variable data digital lithographic image forming devices.

2. Related Art

Lithographic and offset lithographic image forming are commonly understood printing methods for performing high quality multi-color images on a wide array of image receiving media substrates. For the purposes of this disclosure, the terms "printing," "marking" and "image forming" may be used interchangeably. In a typical lithographic image forming process, an image transfer surface, which may be in a form of a flat plate, a surface of a cylinder or drum, a surface of a belt or the like is patterned to include "image regions" generally of hydrophobic/oleophilic materials, and "non-image regions" generally of hydrophilic/oleophobic materials. The image regions correspond to the areas on the final print of an image formed on a target image receiving media substrate that are occupied by a marking material, such as ink, to form the images on the target substrate. The non-image regions correspond to the areas on the final print that are not occupied by the marking material. The hydrophilic regions accept, and are generally readily wetted by surface preparation fluids, which may include water-based fluids or other compound fluids, which may be commonly referred to as dampening fluids or fountain solutions. In embodiments, these dampening fluids conventionally consist of water and small amounts of alcohol and/or other additives and/or surfactants that are included to reduce surface tension of the fluids.

The hydrophobic regions of, for example, a printing plate tend to repel dampening fluid and accept ink, whereas the dampening fluid formed over the hydrophilic regions forms a fluid "release layer" for rejecting the adherence of ink on the imaging surface of the printing plate. The hydrophilic regions of the printing plate thus correspond to unprinted, or "non-image," areas of the final print.

In varying embodiments of conventional systems for lithographic image forming, the ink, as the marking material, may be transferred directly from the imaging surface to a target image receiving media substrate, such as paper or another substrate material at a pressure ink transfer nip. In offset lithographic image forming, the ink may be transferred from the imaging plate surface to an intermediate image transfer surface, such as an offset (or blanket) cylinder. Offset cylinders are often covered with conformable coatings or sleeves with surfaces that can conform to the texture of the imaging plate surface and the target image receiving media substrate, each of which may have, for example, a surface peak-to-valley depth somewhat different from the surface peak-to-valley depth of the other. Surface roughness or conformity of the offset (or blanket) cylinder helps to deliver a more uniform layer of the marking material, including ink, to the target image receiving media substrate free of defects such as mottle. Sufficient pressure is used to transfer the image directly from the imaging plate surface, or from the offset (or blanket) cylinder, to the target image receiving media substrate. This pressure transfer occurs at a transfer nip through which the target image receiving media substrate is pinched between one of the imaging plate and the offset (or blanket) cylinder, and an opposing pressure member, such as an impression cylinder, that provides the pressure on the non-image side of the target image receiving media substrate.

Typical lithographic and offset lithographic printing techniques employ plates that are permanently patterned, and are, therefore, useful for cost-effective image forming only when printing a large number of copies of the same image (i.e., for long print runs), such as magazines, newspapers, and the like. These techniques are not considered useful in creating and printing documents in which new patterns are generated from one page to the next without removing and replacing the print cylinder and/or the imaging plate. In this regard, conventional lithographic and offset lithographic printing techniques cannot accommodate true high-speed variable data printing in which the images may be changeable from impression to impression, for example, as in the case of what may be considered truly digital printing systems. Further, the cost of the permanently patterned imaging plates or cylinders is amortized over the number of copies. The cost per printed copy is, therefore, higher for shorter print runs of the same image than for longer print runs of the same image, as opposed to prints from digital printing systems. Additionally, because images do not change from impression to impression, ink transfer efficiency from the imaging plate surface to one or the other of the offset cylinder or target image receiving media substrate can be comparatively imprecise. Typical of these conventional systems are ink formulations which transfer, on average, as little as 50% of the ink deposited on the imaging plate surface.

SUMMARY OF THE DISCLOSED EMBODIMENTS

In view of the known shortfalls in conventional lithographic image forming with respect to efficient and/or cost effective variable data and/or digital lithographic image forming, a number of techniques have been attempted to implement high-speed digital lithographic printing.

U.S. Patent Application Publication No. 2012/0103212 A1 (the 212 Publication) published May 3, 2012, and based on U.S. patent application Ser. No. 13/095,714, which is commonly assigned and the disclosure of which is incorporated by reference herein in its entirety, proposes systems and methods for providing variable data lithographic and offset lithographic printing of image receiving media marking in an image forming system. The schemes disclosed in the 212 Publication are directed to improvements on various aspects of previously-attempted variable data lithographic marking concepts to achieve effective truly variable digital data lithographic printing.

According to the 212 Publication, a reimageable plate or plate-like surface is provided on an imaging member, which may be a drum, plate, belt or the like. The reimageable plate surface may be composed of, for example, silicones, including polydimethylsiloxane (PDMS) among others. Silicone and fluorosilicone elastomers are widely used in many applications, largely because they can be modified to optimum performance properties, particularly in a variety of marking applications. Desirable physical properties include release, thermal stability, thermal conductivity, hardness, and toughness. The reimageable plate surface of the imaging member may be formed of a relatively thin layer of such a material over a substantial mounting layer, a thickness of the relatively thin layer being selected to balance printing or marking performance with durability and manufacturability concerns and optimization of the stated properties, among others.

The 212 Publication describes an exemplary variable data lithography system 100 such as that shown, for example, the FIGURE. A general description of the exemplary system 100 shown in the FIGURE is provided here. Additional details regarding individual components and/or subsystems shown in the exemplary system 100 of the FIGURE, which provides a real-world utility for the disclosed material component, may be found in the 212 Publication.

As shown in the FIGURE, the exemplary system 100 may include an imaging member 110. The imaging member 110 in the embodiment shown in the FIGURE, although depicted as a drum, is not intended to imply that embodiments of such a device are necessarily restricted to containing a drum-type imaging member. The imaging member 110 in the exemplary system 100 is used to apply an inked image to a target image receiving media substrate 114 at a transfer nip 112. The transfer nip 112 is produced by an impression roller 118, as part of an image transfer mechanism 160, exerting pressure in the direction of the imaging member 110.

The exemplary system 100 may be used for producing images on a wide variety of image receiving media substrates 114. The 212 Publication explains the wide latitude of marking (printing) materials that may be used, including marking materials with pigment densities greater than 10% by weight. Increasing densities of the pigment materials suspended in solution to produce different color inks is generally understood to result in increased image quality and vibrance. These increased densities, however, often result in significant restriction, or even a complete preclusion, in the use of such inks in certain image forming applications that are conventionally used to facilitate variable data digital image forming, including, for example, jetted ink image forming applications. It is the desire to capture the enhanced image quality in a variable data digital image forming system that led to the development of the exemplary system 100 and ongoing extensive experimentation to achieve optimum results.

As noted above, the imaging member 110 may be comprised of a reimageable surface (layer or plate) formed over a structural mounting layer that may be, for example, a cylindrical core, or one or more structural layers over a cylindrical core. A dampening solution subsystem 120 may be provided generally comprising a series of rollers, which may be considered as dampening rollers or a dampening unit, for uniformly wetting the reimageable surface of the imaging member 110 with a layer of dampening fluid or fountain solution, generally having a uniform thickness. Once the dampening fluid or fountain solution is metered onto the reimageable surface, a thickness of the layer of dampening fluid or fountain solution may be measured using a sensor 125 that provides feedback to control the metering of the dampening fluid or fountain solution onto the reimageable surface.

An optical patterning subsystem 130 may be used to selectively form a latent image in the uniform dampening fluid layer by image-wise patterning the dampening fluid layer using, for example, laser energy. As will be discussed in greater detail below, it is advantageous to form the reimageable surface of the imaging member 110 from materials that should ideally absorb most of the laser energy emitted from the optical patterning subsystem 130 close to the reimageable surface. Forming the reimageable surface of such materials may advantageously aid in substantially minimizing energy wasted in heating the dampening fluid and coincidentally minimizing lateral spreading of heat in order to maintain a high spatial resolution capability. The mechanics at work in the patterning process undertaken by the optical patterning subsystem 130 of the exemplary system 100 are described in detail with reference to FIG. 5 in the 212 Publication. Briefly, the application of optical patterning energy from the optical patterning subsystem 130 results in selective evaporation of portions of the uniform layer of dampening fluid in a manner that produces a latent image. As can be well understood, such selective evaporation requires a targeted application of comparatively intense optical energy resulting in a high degree of localized heating to temperature in excess of 300° F. through the dampening fluid and at least in the reimageable surface.

The patterned layer of dampening fluid comprising a latent image over the reimageable surface of the imaging member 110 is then presented or introduced to an inker subsystem 140. The inker subsystem 140 is usable to apply a uniform layer of ink over the patterned layer of dampening fluid and the reimageable surface. In embodiments, the inker subsystem 140 may use an anilox roller to meter ink onto one or more ink forming rollers that are in contact with the reimageable surface. In other embodiments, the inker subsystem 140 may include other traditional elements such as a series of metering rollers to provide a precise feed rate of ink to the reimageable surface. The inker subsystem 140 may deposit the ink to the pockets representing the imaged portions of the reimageable surface, while ink deposited on the unformatted portions of the dampening fluid layer will not adhere to those portions.

Cohesiveness and viscosity of the ink residing on the reimageable surface may be modified by a number of mechanisms, including through the use of some manner of rheology control subsystem 150. In embodiments, the rheology control subsystem 150 may form a partial crosslinking core of the ink on the reimageable surface to, for example, increase ink cohesive strength relative to an adhesive strength between the ink and the reimageable surface. In embodiments, certain curing mechanisms may be employed, which may include, for example, optical or photo curing, heat curing, drying, or various forms of chemical curing. Cooling may be used to modify rheology of the transferred ink as well via multiple physical, mechanical or chemical cooling mechanisms.

Substrate marking occurs as the ink is transferred from the reimageable surface to a substrate of image receiving media 114 using the transfer subsystem 160. With the adhesion and/or cohesion of the ink having been modified by the rheology control system 150, the ink transfers substantially completely preferentially adhering to the substrate 114 as it separates from the reimageable surface at the transfer nip 112. Careful control of the temperature and pressure conditions at the transfer nip 112, combined with reality adjustment of the ink, may allow transfer efficiencies for the ink from the reimageable surface to the substrate 114 to exceed 95%. While it is possible that some dampening fluid may also wet substrate 114, the volume of such transferred dampening fluid will generally be minimal so as to rapidly evaporate or otherwise be absorbed by the substrate 114.

Finally, a cleaning system 170 is provided to remove residual products, including non-transferred residual ink and/or remaining dampening solution from the reimageable surface in a manner that is intended to prepare and condition the reimageable surface to repeat the above cycle for image transfer in variable digital data image forming operations in the exemplary system 100.

The reimageable surfaces of imaging members 110 must satisfy a range of often-competing requirements including (1) surface wetting and pinning the dampening fluid or fountain solution, (2) efficiently absorbing optical radiation from the laser or other optical patterning device, (3) wetting and pinning the ink in the discretely imaged areas of the reimageable surfaces, and (4) releasing the ink, preferably at efficiencies that exceed 95%. The ink release is controlled to promote the highest levels of ink transfer efficiency to the image receiving media substrate 114 to produce high quality images, limit waste, and minimize burden on downstream cleaning systems by yielding a substantially clean imaging surface at an exit of the transfer nip 112.

Reimageable surfaces of imaging members are formed of materials that, through extensive and ongoing experimentation, are determined to advantageously support the steps of the ink-based variable data digital lithographic printing process carried into effect according to systems such as those shown, in an exemplary manner, in the FIGURE. As mentioned above, such reimageable surfaces may be formed of, for example, Silicone and fluorosilicone elastomers for the reasons noted above.

A disadvantage, however, to using silicone elastomers is that silicone rubbers swell in various solvents and in silicone oils. In the current and developing variable data digital image forming technology employing exemplary systems such as those shown in the FIGURE, ink monomers and components, for example, cause significant swelling and monomer absorption into certain standard dimethyl-substituted silicone elastomers. Fluorosilicones that will resist this swelling, and that possess the preferred physical properties for imaging members and intermediate blankets are available. However, fluorosilicones tend to become unstable at higher temperatures (over 300° F.). A particular difficulty at these elevated temperatures, as will be encountered in the above-described image forming processes, is that the instability leads to a consequent release of potentially toxic elemental emissions, including a release of trifluoropropionaldehyde (TFPA), which is an environmental health and safety concern. In addition, the degradation and instability will result in the F-PDMS potentially swelling in certain dampening fluids or fountain solutions, including O4 (octametylcyclotetrasiloxane) and other PDMS based release agents.

Extensive experimentation has been directed at determining and optimizing filler materials and/or improvements to certain of the conventionally-employed filler materials, which may present filler materials that are more suitable for use in the reimageable surfaces of imaging members in variable data digital lithographic image forming devices.

Exemplary embodiments of the systems and methods according to this disclosure may provide fluorosilicone elastomer surface treatments and surface components including infrared-absorbing filler materials advantageously added, or otherwise included, to particularly address high temperature instability concerns.

Exemplary embodiments may provide for the inclusion of carbon black in intermediate and imaging members in various marking applications to provide stability at high temperatures to fluorosilicones. In embodiments, this inclusion enhances stability and may dramatically reduce environmentally unsound or toxic emissions including emissions of TFPA.

Exemplary embodiments may stabilize the image forming components including the disclosed material compositions in conditions of exposure to high temperatures and in oxidative environment that may be encountered from exposure to directed laser energy in the dampening layer patterning process described above. and through other thermal heating, and/or according to combinations of heat sources and operative conditions.

In embodiments, the carbon black may be useful in the surface layer compositions and/or formulations as an infrared radiation acceptor, colorant for disguise of the reimageable surface, and a mechanical stability enhancing and reinforcing filler, mitigating the effluence of TFPA and other thermal degradation by-products.

Exemplary embodiments may provide reimageable surfaces in a form of printing plates for imaging members usable in a variable data digital lithographic printing process, the reimageable surfaces being formed of compositions of material components that are optimized in a manner that the surfaces promote highest levels of durability, wettability, IR energy interaction, ink transfer (while limiting a potential for ink contamination), and high-temperature stability in support of the variable data digital lithographic printing process.

Exemplary embodiments may have printing plates formed of combinations of materials that incorporate carbon black particles in fluorosilicone polymers to provide optimization of the plate surfaces to support the variable data digital lithographic image forming.

Exemplary embodiments are described herein. It is envisioned, however, that any composition, apparatus, method, or system that incorporates features of this disclosure is encompassed by the scope and spirit of the exemplary embodiments.

The above, and other, features, and advantages, of the disclosed systems, methods and formulations are described in, or apparent from, the following detailed description of various exemplary embodiments.

BRIEF DESCRIPTION OF THE DRAWINGS

Various exemplary embodiments of the disclosed systems, methods and formulations for inclusion of carbon black in intermediate and imaging members in various marking applications to provide stability at high temperatures to fluorosilicones and to dramatically reduce hazardous emissions will be described, in detail, with reference to the following drawing, in which:

the FIGURE schematically illustrates an exemplary embodiment of a variable data digital lithographic image forming device in which reimageable surfaces that may be constituted of carbon black particles dispersed in a fluorosilicone polymer compound or layer according to this disclosure may be advantageously employed.

DETAILED DESCRIPTION

Exemplary embodiments are intended to cover alternatives, modifications, and equivalents as may be included within the spirit and scope of the compositions, methods, and systems described below.

The modifiers "about" and/or "substantially," when used in connection with any quantity or feature, are intended to be inclusive of any stated values and as having a meaning dictated by the context. For example, these modifiers may be used to include at least the degree of error associated with any measurement or feature that may be considered reasonable in the particular context. When used with a specific value, the use of the modifier "about" should also be considered as disclosing that specific value.

Reference is made to the drawing to accommodate understanding of an exemplary physical application of the disclosed reimageable surfaces, plate surfaces, plate constituent compositions, and filler components of which a plate or other surface of an imaging component or an intermediate component may be constituted in an image forming system, and methods and systems for using such constituted surfaces, plates and plate surfaces in accordance with the disclosed embodiments, particularly reimageable surface layers comprising fluorosilicone elastomers and/or polymers with carbon black particles dispersed therein for use with variable data digital lithographic printing systems and system components.

"Variable data digital lithographic image forming (or printing)" is a term directed to a unique class of image forming operations in which specialized reimageable surface configurations of imaging members are provided to effect lithographic image forming operations in which images are changeable/changed on each imaging cycle of the device system implementing the image forming scheme and/or as each inked image is formed and passed through a transfer nip to transfer the inked image from the reimageable surface to an image receiving media substrate, or to an intermediate transfer or offset component for further transfer to the image receiving media substrate. The disclosed schemes and materials formulations, arrived at only through extensive experimentation, optimize lithographic printing of variable image data for producing images on individual image receiving media substrates in which the images are changeable with each subsequent rendering of the images on sequential substrates in the image forming process while minimizing adverse image quality effects, including ghosting, and ink contamination effects. A variable data digital lithographic image forming system more broadly is a system that is configured for lithographic printing using specially-formulated lithographic inks and based on digital image data, which may be variable from one image to the next.

An imaging member surface, and particularly a reimageable surface of an imaging member, as discussed above, generally has a tailored topology, which may be a micro-roughened surface, structured to retain a uniform layer of dampening fluid in non-image areas following imaging of a deposited layer of the dampening fluid with an imaging device. Hillocks and pits that constitute the micro-roughened surface enhance the static or dynamic surface energy forces that may attract and "pin" the dampening fluid to the reimageable surface. This "pinning" reduces the tendency of the dampening fluid being forced away from the reimageable surface by roller or other pressure nip action at an ink transfer nip, for example.

The reimageable surface of the imaging member, as mentioned generally above, plays multiple roles in the variable data digital lithographic image forming process. These roles may include: (1) wetting the imaging surface with a uniform layer of dampening fluid, (2) pinning the uniform layer of dampening fluid with respect to the imaging surface, (3) creation of a latent image through image wise patterning of the uniform layer of dampening fluid based on efficient thermal absorption of light energy from an imaging source by the imaging surface, (4) wetting of the patterned (or latent image) with ink for temporary pinning of the ink to the imaged areas of the imaging surface, and (5) enabling substantially complete ink lift off and transfer from the imaging surface to an image receiving media substrate or intermediate transfer member, while retaining surface adhesion pinning of the patterned layer of dampening fluid.

During imaging on the reimageable surface, dampening fluid is removed and the reimageable surface itself is exposed to ink, the ink and dampening fluid constituting generally immiscible liquids or materials. As such, the reimageable surface should weakly adhere to the ink, yet be wettable with the ink, to promote both uniform inking of image areas and to promote subsequent transfer of the ink from the reimageable surface to the image receiving media substrate or intermediate transfer member. The optimization challenge that is among the objectives addressed by the below-claimed embodiments exists in formulating compositions for the constitution of the reimageable surfaces that promote releasing of the inks, while desirably exhibiting a high tendency toward the retention of energy absorbing particles, embedded in the reimageable surfaces, over an extended service life for the reimageable surfaces.

Some other desirable qualities for the reimageable surfaces of the imaging members include high tensile strength to increase a useful service life of the surfaces of the imaging members, and stability of IR absorbing materials to promote even IR absorption in the patterning process.

The disclosed schemes generally incorporate imaging members with reimageable surfaces that meet these requirements, and additionally inhibit the consequent release of potentially hazardous elements resulting from heat absorption and exposure in the patterning process, by including a surface or surface layer having a primary fluorosilicone constituent and an IR absorbing filler material evenly dispersed therein. The term "fluorosilicone" as used in this disclosure may refer generally to polyorganosiloxanes having a backbone formed from silicon and oxygen atoms and sidechains containing carbon, hydrogen, and fluorine atoms. At least one fluorine atom is present in the sidechain. The sidechains can be linear, branched, cyclic, or aromatic. The fluorosilicone may also contain functional groups, such as amino groups, which permit additional crosslinking. When the crosslinking is complete, such groups become part of the backbone of the overall fluorosilicone. Suitable fluorosilicones are commercially available from myriad sources. Mention of any particular commercial source is intended to be exemplary only and not, in any way, limiting to the disclosed commercial compounds and/or sources, which may serve as base elements for the disclosed material compositions.

The incorporation of IR absorbing filler materials is advantageous (and in embodiments, may prove necessary) for laser imaging, and is equally beneficial in other optical image forming schemes. As incorporated, these filler materials require a high degree of dispersion for efficiency. The filler materials should be in a form that preferably does not interact with ink in a manner that may limit, or inhibit, transfer of the ink from the reimageable surface to the image receiving media substrate or to the intermediate transfer surface. The IR absorbing filler materials may absorb IR energy from the infra-red portion of the electromagnetic spectrum. This aids in efficient interaction of the energy radiated from an image wise patterning device, which may include a laser, and the dampening fluid. Known IR absorbing filler materials include carbon black, metal oxides such as iron oxide (FeO), carbon nanotubes, graphene, graphite and carbon fibers. In the disclosed embodiments, carbon black has been determined to be a preferred IR absorbing material. This inclusion should not, however, be considered to necessarily exclude any of the other material types for typical IR absorbing materials noted above.

As noted above, it is important that filler particles do not negatively impact surface interactions when used in, for example, the reimageable surfaces of imaging members during printing operations where surface contamination may result in print defects, or system or operation failure. Substantially homogeneous dispersal of the carbon black particles in the base compositions in the exemplary manner described in the particular experimental examples described below may serve to reduce a formation of adhesion sites, or sites of comparatively higher surface energy, that may otherwise be formed of concentrations of carbon black filler particle surfaces or agglomerated particles that may be present at the surface of coated formulations. It is recognized that surface concentrations of carbon black particles may, for example, "shed" during use based on inadequate "fixing" of the carbon black particles in the surface layer matrix. Unwanted ink/carbon black interactions may occur at a coated reimageable surface and may thus result in ink contamination with non-fixed particles of the IR absorbing material. The adverse effects associated with such interactions may be minimized by at least a process of composition formulation according to the below-indicated examples. An objective of the disclosed composition formation processing may be to provide comparatively finer dispersions of the filler particles in the polymer matrices, which may enhance the surface characteristics for physical interactions such as optical absorption, adherence and high temperature stability. Finer dispersions also enable improved compatibility in a polymer matrix which may lead to enhanced mechanical properties as well.

Filler particles for dispersion in flurosilicone compositions to optimize reimageable surface performance characteristics in accordance with the disclosed embodiments may be "mixed" into the polymer compounds in a manner that promotes homogeneity in the final formulated composition. Fluorosilicone surface layers filled with such particles enable increases in processing, imaging, and ink release performance in the variable data digital lithographic image forming systems and devices in which they are employed, while reducing certain adverse consequent material production difficulties.

Carbon black is a known base material, and is known to be useful as a filler material in many uses including in imaging member surfaces. Carbon black is generally produced by the incomplete combustion of hydrocarbons, or by charring of other organic materials and is readily commercially available from one of several different sources.

The disclosed embodiments may specify a surface layer design composition for a reimageable surface in a variable data digital lithographic image forming device incorporating carbon black particles. Superior compatibility with fluorosilicone enables a fine dispersion within the matrix. The efficient dispersion, compatibility and incorporation of the carbon black particles into a crosslinked fluorosilicone elastomer matrix, and fixing within the matrix in a manner that limits a potential for contamination, including ink contamination is an objective of the disclosed methods.

Methods of manufacturing an imaging member plate or a plate surface layer may include depositing a surface layer composition upon a mold, and curing the surface layer at an elevated temperature. The curing may be conducted at a temperature in a range, for example, from 135° C. to 165° C. Optionally, the surface layer composition may comprise a catalyst, such as platinum. The cured surface layer may have a thickness in a range of from 1 micron to 4 millimeters, or from 5 microns to 1 millimeter, or from 10 microns to 50 microns.

The cured surface layer may be confined to a thickness of less than 50 microns, or less than 20 microns, or less than 10 microns, for the purpose that the near IR radiation may be confined to the narrow topcoat layer for maximum thermal absorption and localized temperature increase. A sharp increase in temperature is necessary for the evaporation of dampening fluid during imaging. A precisely localized area of a temperature increase is necessary to support fine-grained discrete evaporation of the dampening fluid layer for high-quality image production.

An example of a dampening fluid useful with an imaging member surface having the disclosed fluorosilicone and filler particle material composition may be a fluid comprising a siloxane compound. The siloxane compound may be octamethylcyclotetrasiloxane (D4).

Aspects of the present disclosure may be further understood by referring to the following examples. Filler compositions comprising carbon black filler material were produced. The carbon black particles had a diameter in a range of 50 nanometers to 1 micron, and enabled dispersion in fluorinated polymers, and fine dispersion in solvent. The examples are illustrative only.

Example 1

An experimental fluorosilicone obtained from Wacker Silicones (Wacker FS) was formulated into several cross-linked fluorosilicone elastomer samples. The formulations contained two parts (see below): Part A was a vinyl terminated trifluoropropyl methylsiloxane polymer; and part B was a methyl hydrosiloxane-trifluoropropyl methylsiloxane cross-linker.

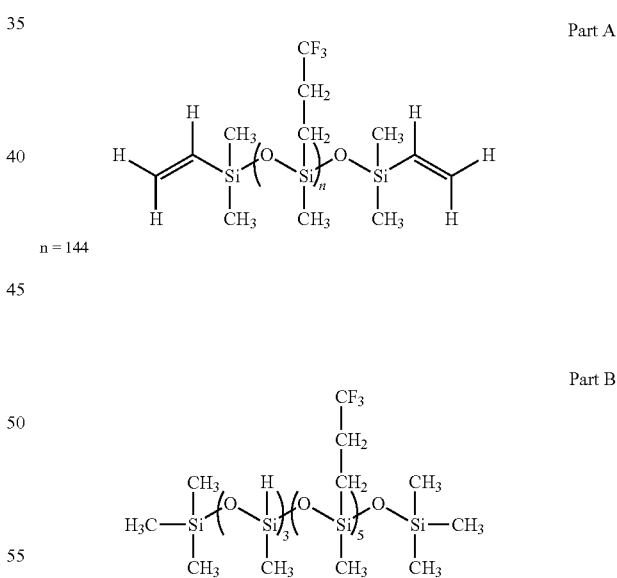

The coatings chemistry is based on platinum-catalyzed addition curing of the two components (polymer containing vinyl groups and crosslinking agent contains Si—H groups) via the hydrosilyation reaction. The principal variants in the experimental formulation were: 1. Wacker FS—unfilled fluorosilicone; 2. Wacker FS—10% carbon black (CB); and 3. Wacker FS—10% Black Iron Oxide (Black IO).

In a representative reaction, an indicated amount of IR filler material (iron oxide or carbon black) was dispersed in solvent trifluorotoluene (TFT) and was tumbled in a ball milling jar overnight. Then, the Part A (polymer) and a measured amount of Pt catalyst was added to the IR filler dispersed solvent. After tumbling for 2-3 hours to ensure proper mixing of the constituent materials to arrive at a Part A formulation, Part B (crosslinker) was added to the Part A formulation and the complete formulation was tumbled for another 30 minutes. The resulting complete formulation was casted on a mold, and cured at an elevated temperature, in a range of 160 C, for 4 hours.

Separately and for comparison, in an absence of any IR fillers, the Part A (polymer), trifluorotoluene and the Pt catalyst was mixed overnight in a ball milling jar, and Part B (crosslinker) was added, in like manner to the above, the next day.

The above formulations resulted in solid elastomer compositions each having adequate physical properties for use in various marking applications. The extractables were done in TFT solvent, and in all the three cases, the extractables were in the range of 4-5%. Table 1 shows the formulation with extractables data.

TABLE 1

| | Sample Form-1 | Sample Form-2 | Sample Form-3 |
|---|---|---|---|
| Flurosilicones (Part A) | 5.0 g | 5.0 g | 5 g |
| Trifluoro toluene (TFT) | 5.0 g | 10.0 g | 5 g |
| Catalyst (Pt) | 15.0 µL | 15.0 µL | 15 µL |
| Iron Oxide (Black) | | | 0.5 g (10%) |
| Carbon Black | | 0.5 g (10%) | |
| Crosslinker (Part B) | 1.0 g | 1 g | 1 g |
| Observation | cured | cured | cured |
| Extractables (after 2 hrs at 130° C.) | 4.1% | 4.3% | 4.7% |

Performance measures for the resultant surfaces were taken. Sample Form 1 was used as a control sample with no additives. Sample Forms 2 and 3 contained additives to note the effects on TFPA generation under heating which would approximate stress conditions in the above-described variable data digital lithographic image forming (marking) print process application. As depicted in the following gas chromatography-mass spectrometry (GC/MS) chart in Table 2B, comparative (or otherwise relative) produced TFPA amounts are drastically reduced by adding the carbon black filler material when the composite material is elevated to an operative temperature. Table 2A provides a lower (non-representative) temperature sample for comparison. The control sample has, for example, a TFPA amount in a range of 92 µg/g, while the sample with the carbon black dispersed therein has a TFPA amount in a range of 27 µg/g at 250 C. It should be noted that propionaldehyde standard was used as a surrogate to calibrate the TFPA species in the samples.

TABLE 2A

Aldehyde Emitted at 200° C.

| Sample ID | TFPA (µg/g) | TFA (µg/g) | Formaldehyde (µg/g) | Acetaldehyde (µg/g) | Acetone (µg/g) |
|---|---|---|---|---|---|
| Wacker FS (No IR Filler - SF1) | 7 | 0.8 | 0.7 | 0.5 | 0.5 |
| Wacker FS (+10% CB - SF3) | 4 | 1 | 1 | 1 | 1 |

TABLE 2A-continued

Aldehyde Emitted at 200° C.

| Sample ID | TFPA (µg/g) | TFA (µg/g) | Formaldehyde (µg/g) | Acetaldehyde (µg/g) | Acetone (µg/g) |
|---|---|---|---|---|---|
| Wacker FS (+10% Black IO - SF2) | 7 | 2 | 2 | 2 | 1 |

TABLE 2B

Aldehyde Emitted at 250° C.

| Sample ID | TFPA (µg/g) | TFA (µg/g) | Formaldehyde (µg/g) | Acetaldehyde (µg/g) | Acetone (µg/g) |
|---|---|---|---|---|---|
| Wacker FS (No IR Filler - SF1) | 92 | 5 | 6 | 4 | 3 |
| Wacker FS (+10% CB - SF3) | 27 | 3 | 5 | 4 | 3 |
| Wacker FS (+10% Black IO - SF2) | 62 | 15 | 15 | 18 | 2 |

In a set of similar and complementing experiments, TFPA production was evaluated from fluorosilicones obtained from NuSil. The fluorosilicones from NuSil (CF 3502) are chemically similar to the Wacker FS. A particular difference is the chain length of part A of the NuSil samples compared to those of Wacker. The Wacker FS samples have a molecular chain length of 144, as indicated above, whereas the NuSil samples have a chain length of 32. An objective of the additional experimentation was to compare the TFPA formation of lower molecular weight vinyl terminated fluorosilicones (NuSil CF3502, n=32) to that of the higher molecular weight fluorosilicones (Wacker FS, n=144). Again, three samples were prepared (1) NuSil FS—unfilled fluorosilicone; (2) NuSil FS—10% carbon black (CB); and (3) NuSil FS—10% Black Iron Oxide (Black IO).

TABLE 3

| | Sample Form 1 | Sample Form 2 | Sample Form 3 |
|---|---|---|---|
| Flurosilicones (Part A) | 6.50 g | 6.55 g | 6.55 g |
| Trifluoro toluene (TFT) | 5.00 g | 10.00 g | 7.00 g |
| Catalyst (Pt) | 7.00 µL | 7.00 µL | 7.00 µL |
| Iron Oxide (Black) | | | 0.50 g (10%) |
| Carbon Black | | 0.50 g (10%) | |
| Crosslinker (Part B) | 1.5 g | 1.5 g | 1.5 g |
| Observation | cured | Cured | Cured |
| Extractables (after 2 hrs at 130° C. | 2.3% | 2.6% | 2.7% |

Table 3 above shows the formulation with extractable data. Table-4B below shows the TFPA generation in the NuSil CF3502 samples with and without fillers. Similar to the results with respect to the Wacker FS samples, the addition of carbon black drastically reduces the TFPA generation. The control sample has a TFPA amount of 116 µg/g, while the sample with the carbon black has a TFPA amount of 20 µg/g at 250° C. Again here, Table 4A provides a lower (non-representative) temperature sample for comparison.

TABLE 4A

| | Aldehyde Emitted at 200° C. | | | | |
|---|---|---|---|---|---|
| Sample ID | TFPA (µg/g) | TFA (µg/g) | Formaldehyde (µg/g) | Acetaldehyde (µg/g) | Acetone (µg/g) |
| NuSilGel (No IR Filler - SF1) | 18 | 1 | 1 | 2 | 0.5 |
| NuSilGel (+10% CB - SF3) | 4 | 0.4 | 1 | 1 | 0.4 |
| NuSilGel (+10% Black IO - SF2) | 7 | 3 | 6 | 6 | 0.5 |

TABLE 4B

| | Aldehyde Emitted at 250° C. | | | | |
|---|---|---|---|---|---|
| Sample ID | TFPA (µg/g) | TFA (µg/g) | Formaldehyde (µg/g) | Acetaldehyde (µg/g) | Acetone (µg/g) |
| NuSilGel (No IR Filler - SF1) | 116 | 4 | 8 | 4 | 1 |
| NuSilGel (+10% CB - SF3) | 20 | 1 | 4 | 3 | 1 |
| NuSilGel (+10% Black IO - SF2) | 52 | 21 | 32 | 44 | 1 |

While the effluent levels are quite low both in the above-indicated experimental cases of Wacker FS (high molecular weight) and NuSil samples (low molecular weight), any allowable limits in practical use may be further refined and/or defined according to an organization's internal environmental health and safety division, and/or governmental agencies and/or institutions. As determined above, however, when used in low temperature situations (below approximately 300° F.), the disclosed IR filler material stabilization, particularly through the use of carbon black as the IR filler material, will provide certain safeguards that, in an event of a higher temperature anomaly, a release of TFPA would be reduced sufficiently to mitigate any attendant risk.

Reimageable surfaces for imaging members particularly usable in variable data digital lithographic image forming schemes and associated systems will benefit from carbon black being incorporated into fluorosilicone surface layer designs, particularly in components that may be locally heated to comparatively high temperatures in the image forming process. Fine, homogeneous dispersions of, for example, carbon black filler particles in fluorosilicone coatings, enabling more efficient IR absorption among other benefits, while reducing hazardous byproduct production, are achievable. The carbon black inclusion in the design of the surface layer formulations enables increasingly efficient processing, imaging, and overall system performance in the image forming systems.

In summary, the disclosed schemes provide a particularly advantageous design for a reimageable surface by introducing a unique materials composition for a digital offset printing plate containing carbon black particles homogeneously dispersed into fluorosilicone. In experiments, carbon black along with IR fillers and reinforcing fillers in material compositions for forming imaging surfaces in imaging members, particularly those that may be usable in a variable data digital lithographic image forming system can also be used to provide stability at high temperatures to fluorosilicones and to dramatically reduce the emission of TFPA.

The present disclosure has been described with reference to exemplary embodiments. Modifications and alterations will occur to others upon reading and understanding the preceding detailed description. It is intended that the present disclosure be construed as including all such modifications and alterations insofar as they come within the scope of the appended claims or the equivalents thereof.

What is claimed is:

1. A material composition useful for print systems applications, comprising:
   a crosslinked fluorosilicone elastomer formed by a reaction of
   a polymer having a molecular structure according to the following Part A:

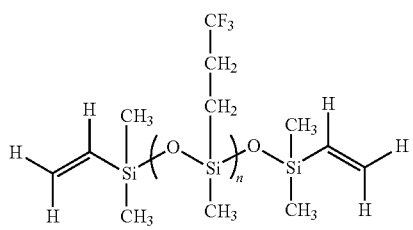

Part A n = 144 and a crosslinking agent containing hydrosilane groups;
   and an infra-red (IR) absorbing filler material homogeneously mixed with the crosslinked fluorosilicone elastomer to form the material composition.

2. The material composition of claim 1, the polymer and the crosslinking agent being combined in a platinum-catalyzed addition curing process promoting a hydrosilylation reaction.

3. The material composition of claim 1, the crosslinking agent being methyl hydrosiloxane-trifluoropropyl methylsiloxane cross-linker.

4. The material composition of claim 1, the crosslinking agent having a molecular structure according to the following Part B:

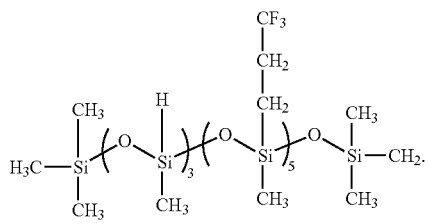

Part B

5. The material composition of claim 1, the IR absorbing filler material comprising 10% by weight of the material composition.

6. The material composition of claim 1, the IR absorbing filler material being carbon black.

7. A method for producing a material composition, comprising:
   dispersing an IR filler material, in particulate form, in a trifluorotoluene (TFT) solvent to produce a first stage solvent mixture;

tumbling the first stage solvent mixture in a ball milling jar for at least six hours;
adding (1) a polymer having a molecular structure according to the following Part A:

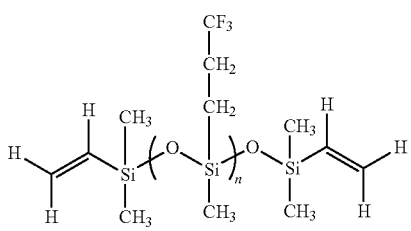
Part A n = 144 and (2) a platinum catalyst to the first stage solvent mixture in the ball milling jar to form a second stage solvent mixture;
tumbling the second stage solvent mixture in the ball mixing jar for at least two hours;
adding a crosslinking agent to the second stage solvent mixture in the ball milling jar and tumbling for at least 30 minutes to facilitate a platinum-catalyzed addition curing process promoting a hydrosilylation reaction to produce the material composition.

8. The method of claim 7, the crosslinking agent being methyl hydrosiloxane-trifluoropropyl methylsiloxane crosslinker.

9. The method of claim 7, the crosslinking agent having a molecular structure according to the following Part B:

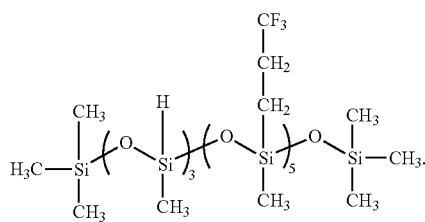
Part B

10. The method of claim 7, the IR absorbing filler material comprising 10% by weight of the material composition.

11. The method of claim 7, the IR absorbing filler material being carbon black.

12. An imaging member for an image forming device, comprising:
 a structural mounting component; and
 an outer surface layer on the structural mounting component, comprising:
  a crosslinked fluorosilicone elastomer formed by a reaction of
  a polymer having a molecular structure according to the following Part A:

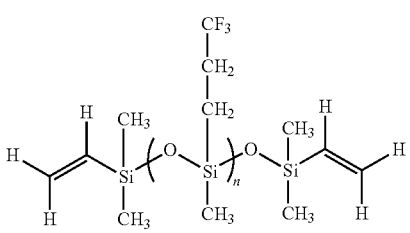
Part A n = 144 and a crosslinking agent containing hydrosilane groups; and
an infra-red (IR) absorbing filler material homogeneously mixed with the crosslinked fluorosilicone elastomer.

13. The imaging member of claim 12, the polymer and the crosslinking agent being combined in a platinum-catalyzed addition curing process promoting a hydrosilylation reaction.

14. The imaging member of claim 13, a layer of the crosslinked fluorosilicone elastomer being casted on the structural mounting component and cured on the structural mounting component at a temperature a range of 1500 C or higher for at least 3 hours to form the outer surface layer on the structural mounting component.

15. The imaging member of claim 12, the IR absorbing filler material comprising 10% by weight of the outer surface layer on the structural mounting component.

16. The imaging member of claim 12, the IR absorbing filler material being carbon black.

\* \* \* \* \*